United States Patent
Jang

(10) Patent No.: US 9,241,267 B2
(45) Date of Patent: Jan. 19, 2016

(54) RADIO COMMUNICATION APPARATUS AND RADIO COMMUNICATION METHOD

(71) Applicant: KABUSHIKI KAISHA TOSHIBA, Minato-ku (JP)

(72) Inventor: Kyungwoon Jang, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 142 days.

(21) Appl. No.: 14/015,085

(22) Filed: Aug. 30, 2013

(65) Prior Publication Data

US 2014/0242906 A1    Aug. 28, 2014

(30) Foreign Application Priority Data

Feb. 25, 2013   (JP) .................................. 2013-34919

(51) Int. Cl.
  *H04W 12/06*   (2009.01)
  *H04W 4/00*    (2009.01)

(52) U.S. Cl.
  CPC .............. *H04W 12/06* (2013.01); *H04W 4/008* (2013.01)

(58) Field of Classification Search
  CPC .......... H04L 9/00; H04L 9/32–9/3297; H04L 63/04–63/0892; G06F 21/30–21/645; G06F 9/00; H04M 1/66; H04B 5/00
  USPC .......................................................... 726/4
  See application file for complete search history.

(56) References Cited

U.S. PATENT DOCUMENTS

| 2010/0082490 | A1* | 4/2010 | Rosenblatt | G06Q 20/32 705/64 |
| 2010/0319055 | A1* | 12/2010 | Tamura | H04W 12/06 726/4 |
| 2011/0124286 | A1* | 5/2011 | Tanaka | H04W 76/023 455/41.1 |

(Continued)

FOREIGN PATENT DOCUMENTS

| JP | H11-068713 | 9/1999 |
| JP | 2007-041718 A | 2/2007 |
| JP | 2008-154004 A | 7/2008 |

(Continued)

OTHER PUBLICATIONS

Japanese Office Action issued Jun. 19, 2015 in Japanese Patent Application No. 2013-034919, with English translation.

(Continued)

*Primary Examiner* — Linglan Edwards
*Assistant Examiner* — Quazi Farooqui
(74) *Attorney, Agent, or Firm* — White & Case LLP

(57) ABSTRACT

According to one embodiment, a radio communication apparatus includes a radio communicator, a storage, and a controller. The radio communicator is configured to perform close proximity wireless communication or near field wireless communication with other radio communication apparatus. The storage is configured to store data, setting parameters associated with the data, and an application. The controller is configured to execute the application and control a transmission and reception of the data performed by the radio communicator on the basis of the application. The application can be set to a read-only mode by an operation of a user. The setting parameters include transfer permission information. The controller checks whether or not a user is an authorized user of the radio communication apparatus, when the user is the authorized user, the controller executes the application and thereby activates the radio communicator.

6 Claims, 5 Drawing Sheets

(56) References Cited

U.S. PATENT DOCUMENTS

2013/0189950 A1 7/2013 Hamada
2013/0262856 A1* 10/2013 Moshfeghi .............. H04L 63/08
713/155

FOREIGN PATENT DOCUMENTS

| JP | 2011-077949 A | 4/2011 |
| JP | 2011-204246 A | 10/2011 |
| WO | 2012035628 A1 | 3/2012 |

OTHER PUBLICATIONS

Standard ECMA-398, "Close Proximity Electric Induction Wireless Communications" ECMA International Jun. 2011.

Standard ECMA-399, "Procedure for the Registration of Assigned Numbers for ECMA-398" ECMA International Jun. 2011.

* cited by examiner

RADIO COMMUNICATION APPARATUS AND
RADIO COMMUNICATION METHOD

CROSS REFERENCE TO RELATED
APPLICATIONS

This application is based upon and claims the benefit of priority from the prior Japanese Patent Application No. 2013-34919 filed on Feb. 25, 2013, the entire contents of which are incorporated herein by reference.

FIELD

Embodiments described herein relate generally to a radio communication apparatus and a radio communication method.

BACKGROUND

TransferJet (registered trademark) is a near field/close proximity wireless communication technique, which currently attracts attention. It is possible to easily and quickly distribute and share the content by coming devices including the TransferJet into contact with each other.

However, use cases are increasing in which content is required to be securely processed and managed from a viewpoint of protecting the content from careless use and unexpected use.

DETAILED DESCRIPTION

Figure 1:
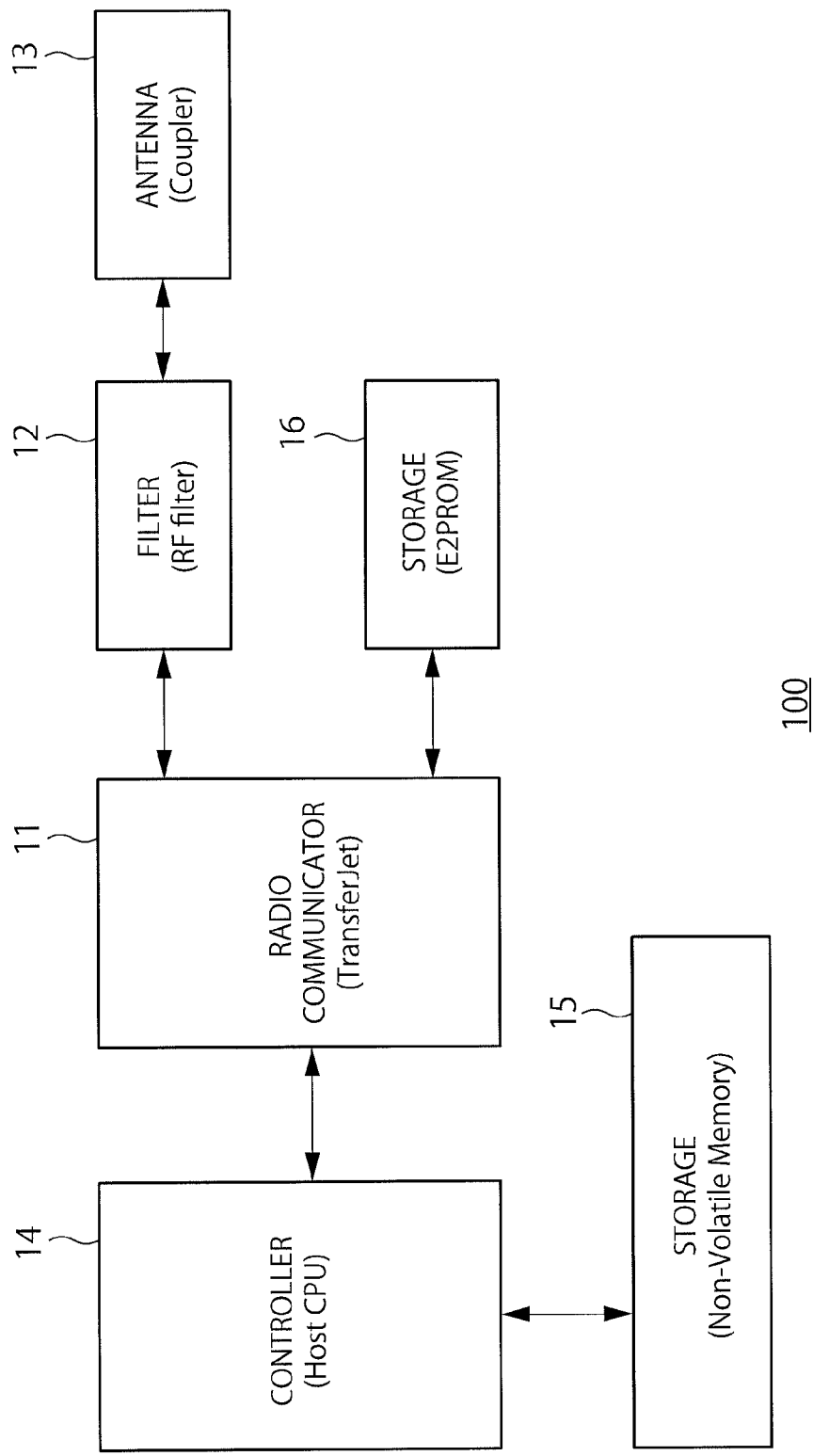
FIG. 1 is a block diagram showing a configuration of a radio communication apparatus according to a first embodiment of the present invention.

In general, according to one embodiment, a radio communication apparatus includes a radio communicator, a storage, and a controller. The radio communicator is configured to perform close proximity wireless communication or near field wireless communication with other radio communication apparatus. The storage is configured to store data, setting parameters associated with the data, and an application. The controller is configured to execute the application and configured to control a transmission and reception of the data performed by the radio communicator on the basis of the application. The application can be set to a read-only mode by an operation of a user. The setting parameters include transfer permission information. The controller checks whether or not a user is an authorized user of the radio communication apparatus, when the user is the authorized user, the controller executes the application and thereby activates the radio communicator. After the controller activates the radio communicator, when the application is not set to the read-only mode, the controller determines whether or not there is a transfer permission on the basis of the transfer permission information of the setting parameter. When the controller determines that there is the transfer permission, the controller causes the radio communicator to transfer the data.

Prior to the description of embodiments of the present invention, the TransferJet technique which comes to the knowledge of the inventor will be described.

In the TransferJet, stable high-speed data transmission can be performed by a simple operation, so that it is considered that the TransferJet will be an important technique for content distribution between devices.

The TransferJet realizes high-speed data transmission at maximum of 560 Mbps and effective throughput of 375 Mbps when a user simply performs a "touch operation". The communicable distance is at most several centimeters and the connection form (network topology) is always one-to-one (point-to-point).

The communicable distance and the connection form make the system very simple. Since the communication distance is short, close proximity wireless communication can be performed by very small transmission power of −70 dBm/MHz or less. Further, the connection form is one-to-one, so that setting and management of the network are significantly simplified. Each TransferJet device detects another device only when another device comes in a range of communicable distance of the TransferJet device. Transmission is not performed unless another device is detected, and thus, it is possible to save power consumption. This is also an advantage of a touch model.

It is possible to easily and quickly distribute and share the content between such TransferJet devices. Therefore, it can be considered that malicious users may distribute and share charged copyrighted content without permission. In recent years, encryptographic technique progresses day by day along with development of cryptographic technique. Therefore, it is hard to say that only encrypting content is an adequate measure. In particular, it is necessary to protect and manage personal information, charged content, content with a parental lock and the like against careless use and unexpected use.

Further, when considering a combination with a billing/authentication system such as NFC (Near Field Communication), a security system with higher reliability is very important.

The inventor has made the present invention based on the knowledge described above.

Hereinafter, embodiments of the present invention will be described with reference to the drawings. The embodiments do not limit the present invention.

FIG. 1 is a block diagram showing a configuration of a radio communication apparatus 100 according to a first embodiment of the present invention. The radio communication apparatus 100 in FIG. 1 is configured to perform close proximity wireless communication or near field communication with another radio communication apparatus (not shown in FIG. 1) by one-to-one basis.

In the present embodiment, the close proximity wireless communication means radio communication performed in a state in which the radio communication apparatus 100 and another radio communication apparatus are in contact with each other or come close to each other, for example, within a range of several centimeters. TransferJet is an example of a radio communication scheme (communication standard) of the close proximity wireless communication. The near field communication means radio communication performed within a small range, for example, within a range of tens of meters or less. Bluetooth (registered trademark), wireless LAN, or the like are examples of a radio communication scheme of the near field communication, for example.

In the description below of the present embodiment, it is assumed that the radio communication apparatus 100 and another radio communication apparatus perform the close proximity wireless communication by using the same radio communication scheme, TransferJet. In other words, the radio communication apparatus 100 and the other radio communication apparatus are devices in which the TransferJet is mounted and the devices in which the TransferJet is mounted perform the close proximity wireless communication with each other.

For example, the radio communication apparatus 100 and the other radio communication apparatus may be configured as a portable electronic device such as a smartphone, however, it is not limited to this.

As shown in FIG. 1, the radio communication apparatus 100 includes a radio communicator (TransferJet) 11, a filter (RF Filter) 12, an antenna (Coupler) 13, a controller (Host CPU) 14, a storage (Non-Volatile Memory) 15, and a storage (E2PROM) 16.

The radio communicator 11 performs the close proximity wireless communication with another radio communication apparatus by transmitting and receiving a first radio signal through the filter 12 and the antenna 13. In other words, the radio communicator 11 transmits and receives data to be transmitted.

The filter 12 removes cross talk between the transmitted and received first radio signal and noise. In the present embodiment, it is assumed that the TransferJet is used, so that a coupler is used as the antenna 13 in order to enable one-to-one high-speed communication where the communication distance is limited to a short distance of several centimeters. If another radio communication scheme is used, the antenna 13 compatible with the radio communication scheme may be used.

The controller 14 is, for example, a host CPU which controls the radio communicator 11. Specifically, the controller 14 can execute an application (software) of the TransferJet and controls and manages the transmission and reception of data performed by the radio communicator 11 on the basis of the application.

Therefore, the application of the TransferJet may be referred to as a radio communication control application for transmitting and receiving data by the close proximity wireless communication. The application of the TransferJet can be set to a read-only mode (mode in which data transmission is forbidden) by the operation of the user. When the application is set to the read-only mode, data is not transmitted (transferred) and data is only received.

The storage 15 is a non-volatile memory such as a NAND-type flash memory. The storage 15 stores the application (software) of the TransferJet, an activation code unique to an authorized user, data, setting parameters associated with the data, and transfer trace information associated with the data.

Examples of the data stored in the storage 15 include data of charged or free content obtained from an Internet site or another radio communication apparatus, data of user's own content created by the user and so on. These contents include, for example, music, image, video, map, electronic book, and software.

In other words, the storage 15 may store a plurality of sets of data of a plurality of contents. In this case, the storage 15 stores a plurality of setting parameters and a plurality of transfer trace information, each of which is associated with each set of data.

In the case of the charged content, for example, the setting parameter is attached to the data of the content and the setting parameter can be obtained at the same time as when the user purchases the charged content from a site of a content distributer (seller) and downloads the charged content. Or, the setting parameter may be obtained from the site of the content distributer or the like separately from the data of the content. In this case, the setting parameter can be set from the content distributer and the user cannot change the setting parameter.

Also in the case of the free content, for example, the setting parameter may be attached to the content. In this case, the user may or may not change the setting parameter.

In the case of the user's own content, the user sets the setting parameter.

The setting parameter includes, for example, transfer permission information and the presence or absence of encryption instruction. The transfer permission information includes, for example, the presence or absence of initial transfer permission, a permitted data range, and a permitted number of transfer times. As described later, in the present embodiment, if the initial transfer permission is present, it is possible to transfer data of the permitted data range within a range of the permitted number of transfer times. The permitted data range is information indicating all the data or a part of the data.

The transfer trace information includes information related to transfer of data (for example, the number of data transfer times and/or the number of times a transfer request is ignored). As described later, after transfer of data is completed according to a transfer request and after a transfer request is ignored, the controller 14 records information related to the transfer of the data requested to be transferred in the transfer trace information.

The storage 16 is an E2PROM and stores, for example, an individual ID (Unique ID) which is identification information unique to the radio communication apparatus 100. The unique ID may be stored in the storage 15 instead of the storage 16 depending on the entire system configuration. Since each device in which the TransferJet is mounted has a unique ID, the radio communication apparatus 100 can identify any wirelessly-connected device by acquiring the unique ID from the wirelessly-connected device.

Figure 2:
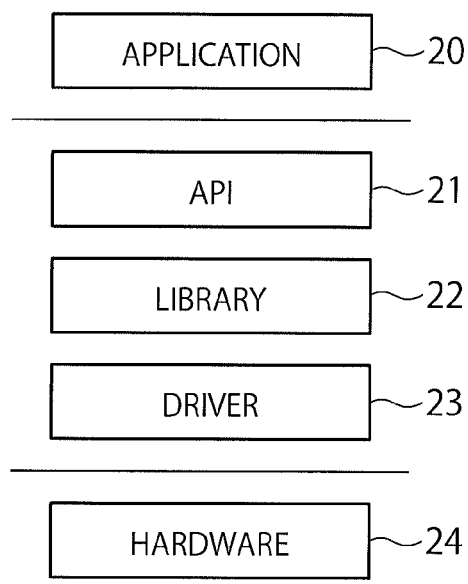
FIG. 2 is a diagram schematically showing the architecture for controlling the close proximity wireless communication according to the first embodiment.

Here, architecture for controlling the close proximity wireless communication of the radio communication apparatus 100 will be described. FIG. 2 is a diagram schematically showing the architecture for controlling the close proximity wireless communication according to the first embodiment.

An application 20 corresponds to the application of the TransferJet.

An API (Application Programming Interface) 21 is an interface to a function of a library 22 available from the application 20. The API 21 is provided in a form of a command or a function.

The library 22 is a library in which a plurality of programs having specific functions is collected so that the programs can be used from the application 20.

The driver 23 is dedicated software for controlling and operating hardware 24. The hardware 24 corresponds to the radio communicator 11.

Next, an operation of the radio communication apparatus 100 will be described with reference to FIGS. 3 and 4. Here, it is assumed that the radio communication apparatus 100 and the other radio communication apparatus, which are devices in which the TransferJet is mounted, transfer data on one-to-one basis, the radio communication apparatus 100 on one side is data transmitting side, and the other radio communication apparatus is data receiving side.

First, a user performs a log-in operation to the radio communication apparatus 100 and the controller 14 checks whether or not the user who performs the log-in operation is an authorized user of the radio communication apparatus 100. If the user is an authorized user, the controller 14 executes the application of the TransferJet and thereby activates the radio communicator 11. If the user is not an authorized user, the controller 14 does not execute the application of the TransferJet and does not activate the radio communicator 11.

Figure 3:
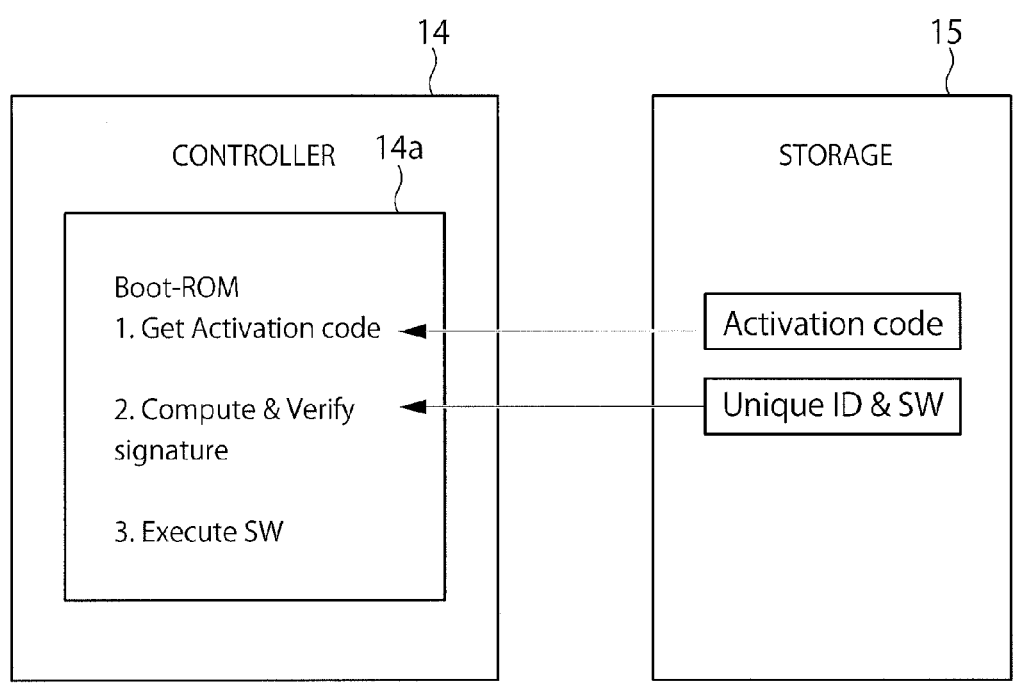
FIG. 3 is a diagram for explaining boot processing of the radio communicator of the radio communication apparatus according to the first embodiment.

FIG. 3 is a diagram for explaining boot processing of the radio communicator 11 of the radio communication apparatus 100 according to the first embodiment. As shown in FIG. 3, the boot processing is performed by the controller 14 according to three procedures stored in a boot ROM (Boot-ROM) 14a included in the controller 14. The boot ROM 14a stores a procedure 1; acquiring an activation code (Get Activation code), a procedure 2; computing and verifying a signature (Compute & Verify signature), and a procedure 3; executing software (Execute SW).

Specifically, when the user inputs user information (log-in ID and the like) for log-in by using an input unit not shown in the drawings, the controller 14 acquires a preset activation code from the storage 15 (procedure 1) and calculates a correlation between the activation code and the unique ID (procedure 2). In other words, the controller 14 performs a predetermined calculation between the activation code and the unique ID. In the example in FIG. 3, to clarify the description, it is assumed that the unique ID is stored in the storage 15.

Next, when the correlation, which is the calculation result, corresponds to the user information input by the user for log-in, the controller 14 confirms that the user is an authorized user, executes the application (software) of the TransferJet (procedure 3), and thereby activates the radio communicator 11 and enables data transmission/reception processing.

The activation code may be, for example, a password set by the authorized user in advance. The activation code may also be a code which is generated by hardware and stored in the storage 15 every time the user performs the log-in operation. When the hardware is used, for example, the activation code may be generated by using PUF (Physical Unclonable Function) in order to improve security level.

At least one of the activation code and the unique ID can be encrypted and managed by using an encryption key according to the security level. The encryption key can be generated by well-known software processing or hardware processing. When performing the hardware processing, encryption hardware may be added to the configuration in FIG. 1. In other words, in this configuration, a system constructor can determine whether or not to use encryption by considering cost.

When the correlation, which is the calculation result, does not correspond to the user information input by the user for log-in and the controller 14 cannot confirm that the user who performs the log-in operation is an authorized user, the controller 14 does not execute the application (software) of the TransferJet and does not activate the radio communicator 11. Therefore, the user who is not an authorized user cannot perform the data transmission/reception processing.

By adding the secure boot processing in this way, it is possible to more reliably prevent unexpected use by an unauthorized user from occurring and protect important data such as personal information than in a case in which only a password is used.

After the radio communicator 11 is activated by the aforementioned boot processing, the radio communication apparatus 100 is brought close to the other radio communication apparatus by the user and the radio communication apparatus 100 performs connection and authentication between the radio communication apparatus 100 and the other radio communication apparatus. Thereafter, the radio communication apparatus 100 manages transfer of data according to a flowchart described below.

Figure 4:
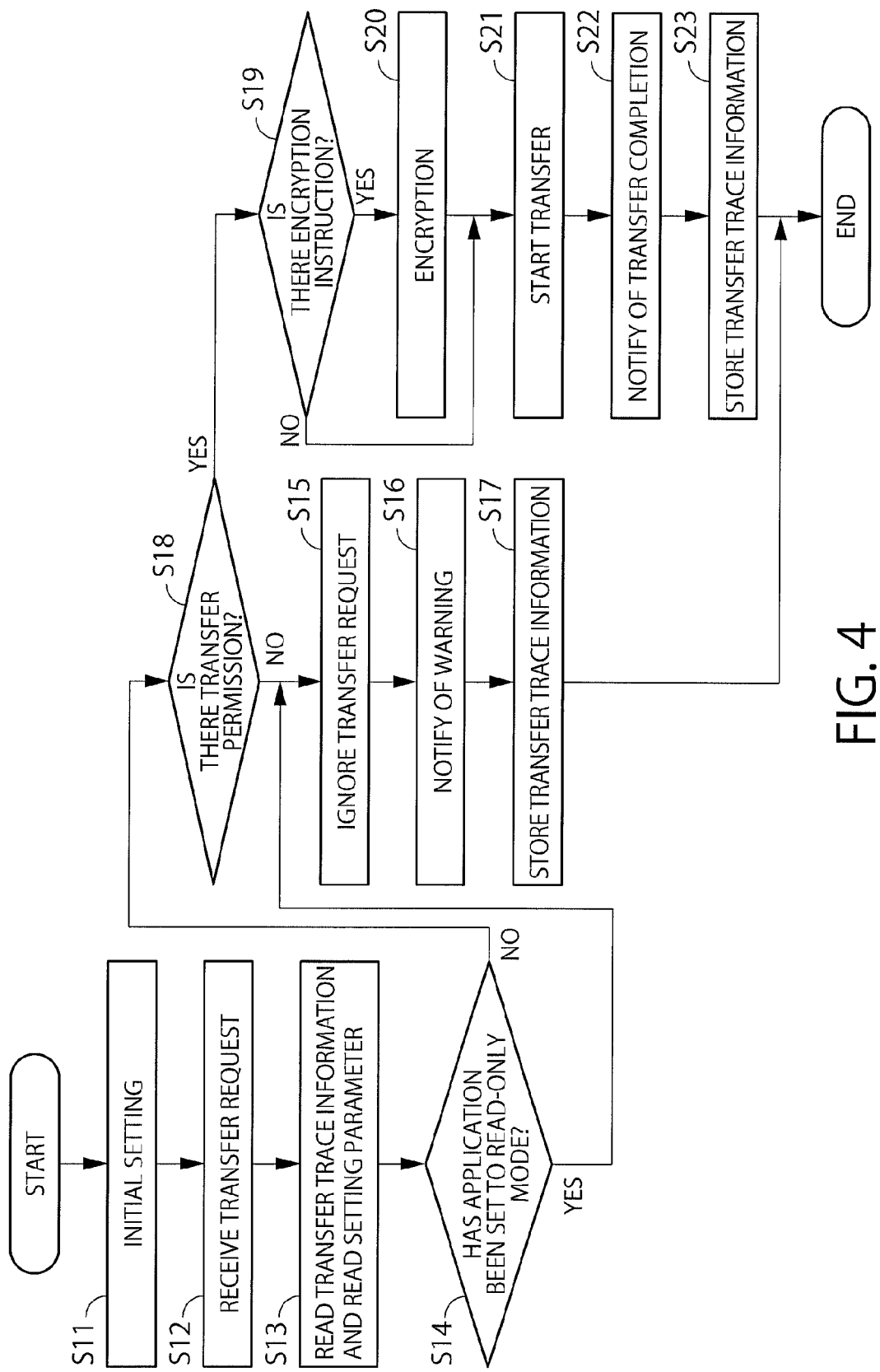
FIG. 4 is a flowchart showing a management method of the transfer of data of the radio communication apparatus according to the first embodiment.

FIG. 4 is a flowchart showing a management method of the transfer of data of the radio communication apparatus 100 according to the first embodiment. Each process in the flowchart is performed by the controller 14. As shown in FIG. 4, first, the controller 14 performs initial setting (step S11).

Subsequently, for example, the user operates an input unit not shown in the drawings of the radio communication apparatus 100 and designates data to be requested to be transferred from one or a plurality of sets of data. Thereby, the controller 14 receives a transfer request (command) by the operation of the user (step S12).

Subsequently, the controller 14 reads the transfer trace information and the setting parameter associated with the data requested to be transferred from the storage 15 (step S13).

Subsequently, the controller 14 determines whether or not the application of the TransferJet is set to the read-only mode (step S14). When the application of the TransferJet is set to the read-only mode (step S14: Yes), the controller 14 ignores the transfer request (step S15) and does not cause the radio communicator 11 to transfer data. In this case, the controller 14 may turn off the radio communicator 11. Then, the controller 14 outputs a warning signal and notifies the user of some sort of warning such as sound or screen display on the basis of the warning signal (step S16). Thereby, the user can easily recognize that the data requested to be transferred cannot be transferred.

Thereafter, the controller 14 records the number of times the transfer request is ignored in the transfer trace information as the information related to transfer of data (step S17) and ends the process.

On the other hand, when the application of the TransferJet is not set to the read-only mode (step S14: No), the controller 14 determines whether or not there is transfer permission on the basis of the transfer permission information of the setting parameter and the read transfer trace information (step S18). Specifically, if there is the initial transfer permission in the transfer permission information and the number of data transfer times in the transfer trace information is smaller than the permitted number of transfer times, the controller 14 determines that there is the transfer permission. On the other hand, when there is no initial transfer permission or when the number of data transfer times is greater than or equal to the permitted number of transfer times, the controller 14 determines that there is no transfer permission.

When the controller 14 determines that there is no transfer permission (step S18: No), the controller 14 ignores the transfer request (step S15) and does not cause the radio communicator 11 to transfer data. Then, the controller 14 performs the processes of the steps S16 and S17, and thereafter the controller 14 ends the process.

On the other hand, when the controller 14 determines that there is the transfer permission (step S18: Yes), the controller 14 determines whether or not there is an encryption instruction (step S19). When a parameter of the encryption instruction is ON, that is, when there is the encryption instruction (step S19: Yes), the controller 14 encrypts data of the permitted data range by well-known software processing or hardware processing by using an encryption key (step S20) and causes the radio communicator 11 to transfer the encrypted data (step S21). When performing the hardware processing, encryption hardware may be added to the configuration in FIG. 1. The other radio communication apparatus which receives the encrypted data needs a common encryption key to open the data.

When the parameter of the encryption instruction is OFF, that is, when there is no encryption instruction (step S19: No), the controller 14 does not encrypt the data of the permitted data range and promptly starts transmission of the data (step S21). In other words, the controller 14 causes the radio communicator 11 to transfer the data without encrypting the data.

After the step S21, the controller 14 outputs a transfer completion signal and thereby notifies the user of the transfer completion by sound, screen display, or the like (step S22).

Thereafter, the controller 14 records the number of data transfer times in the transfer trace information as the information related to transfer of data (step S23) and ends the process.

The transfer trace information recorded in step S17 and step S23 is managed so that the transfer trace information is utilized according to intended purposes of the user and the content distributer (or content creator). An example of a utilization method of the transfer trace information will be described below.

Usually, charged content is configured not to be transferred or configured to be able to be transferred only a permitted number of transfer times. However, a free portion of some charged content is configured to be able to be transferred any number of times. The free portion may be set to the permitted data range in the transfer permission information of the setting parameter as described above. A user who purchases such charged content can transfer the free portion to any other user by using the radio communication apparatus 100. As described above, the number of data transfer times is recorded when the transfer occurs. The other user can determine whether or not to purchase the charged content by viewing the free portion. This is an example of an application using, for example, a function referred to as "content recommendation function".

When the user who purchased the charged content accesses the site of the content distributer (seller) again, the radio communication apparatus 100 transmits the transfer trace information to a server of the content distributer. The transfer trace information includes the number of transfer times of the transfer data, so that the content distributer can know how many times the free portion of the charged content is transferred.

After the process of the flowchart in FIG. 4 is completed, if the controller 14 receives new transfer request from a user, the controller 14 performs the processes after the step S12 again.

As described above, according to the present embodiment, when the user is an authorized user, the controller 14 executes the application of the TransferJet and activates the radio communicator 11, and when the user is not an authorized user, the controller 14 does not execute the application of the TransferJet and does not activate the radio communicator 11. After the controller 14 activates the radio communicator 11, if the application of the TransferJet is set to the read-only mode, the controller 14 causes the radio communicator 11 not to transfer data. On the other hand, when the application of the TransferJet is not set to the read-only mode, the controller 14 determines whether or not there is the transfer permission on the basis of the transfer permission information of the setting parameter associated with the data. If the controller 14 determines that there is the transfer permission, the controller 14 causes the radio communicator 11 to transfer the data, and if the controller 14 determines that there is no transfer permission, the controller 14 causes the radio communicator 11 not to transfer the data.

Thereby, it is possible to manage the transfer of data, so that it is possible to deal with careless use with a risk that the data is transferred to an unintended third party and unexpected use by an unauthorized user. Therefore, more secure and safe data transfer and data management can be performed. In other words, it is possible to distribute and share data of content including personal information and the like, which must be protected and managed, in accordance with purposes of the creator and the distributer of the content.

Further, when the application of the TransferJet is set to the read-only mode, even if the application of the TransferJet is performed, it is possible to reliably prevent the data from being transferred. Therefore, the safety can be further improved. It is possible to easily switch whether or not to set the read-only mode by an operation of the user, so that the convenience is high.

Further, it is possible to realize such a highly reliable secure system which cannot be used by users other than authorized users, so that even in a case in which an authentication/charging system using NFC is combined with the radio communication apparatus 100, it is possible to prevent unauthorized use by an unauthorized user from occurring.

When the near field communication is used instead of the close proximity wireless communication, the radio communicator 11, the filter 12, the antenna 13 and the application, which are compatible with the near field communication, may be employed.

Second Embodiment

The present embodiment is different from the first embodiment in a point that a radio communication apparatus operates by power received by a radio signal.

Figure 5:
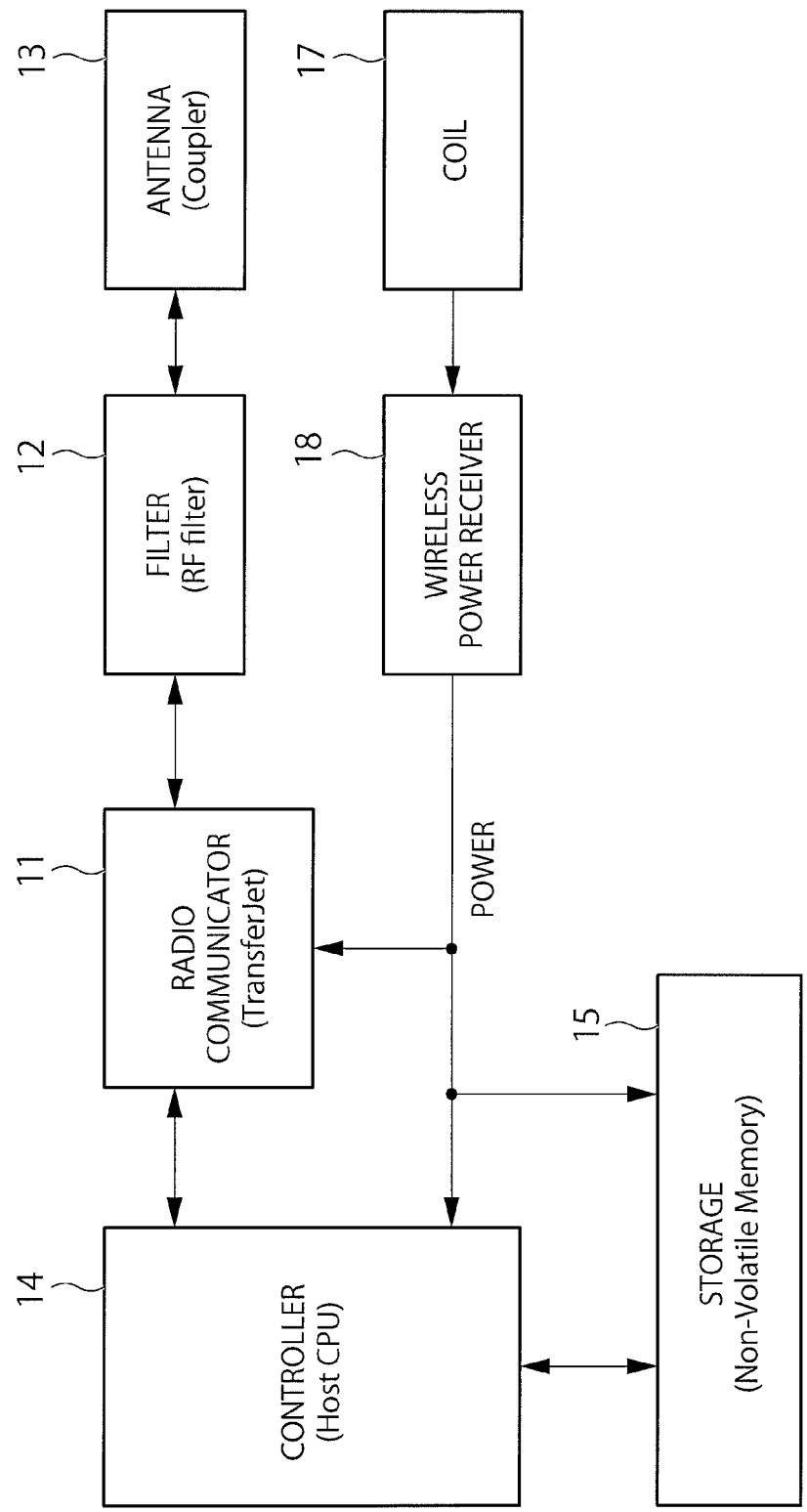
FIG. 5 is a block diagram showing a configuration of a radio communication apparatus according to the second embodiment of the present invention.

FIG. 5 is a block diagram showing a configuration of a radio communication apparatus 100a according to the second embodiment of the present invention. As shown in FIG. 5, the radio communication apparatus 100a includes a coil 17 and a wireless power receiver 18 in addition to the configuration of the radio communication apparatus 100 of the first embodiment. The radio communication apparatus 100a does not include the storage 16 of the first embodiment and the unique ID is stored in the storage 15. The other components are the same as those in the first embodiment shown in FIG. 1, so that the same components are denoted by the same reference numerals and the description thereof will be omitted.

The radio communication apparatus 100a of the present embodiment is configured to be able to perform close proximity wireless communication with another radio communication apparatus (not shown in the drawings) on the power transmission side by one-to-one basis as well as to be supplied power from the radio communication apparatus on the power transmission side. The radio communication apparatus on the power transmission side is a radio communication apparatus which transmits and receives a first radio signal for the close proximity wireless communication and transmits power by a second radio signal.

For example, the radio communication apparatus 100a may be provided inside a wireless memory where data can be wirelessly written and read, and the radio communication apparatus on the power transmission side may be provided inside a portable electronic device such as a smartphone. In such a configuration, the wireless memory is wirelessly supplied power from the portable electronic device. Further, the wireless memory can transmit read data to the portable electronic device, and data received from the portable electronic device can be written to the wireless memory.

The wireless power receiver 18 receives power by the second radio signal different from the first radio signal through the coil 17. The frequency of the second radio signal is lower than that of the first radio signal. For example, the wireless power receiver 18 receives power by using electromagnetic induction according to a method compatible with the standard of WPC (Wireless Power Consortium). The wireless power receiver 18 may receive power by a magnetic field resonance method and may be compatible with the standard of NFC (Near Field Communication).

The wireless power receiver 18 has a first phase where at least negotiation for stable wireless power reception is performed according to the start of wireless power reception, and a second phase where stable wireless power reception is started after completion of the negotiation.

The radio communicator 11, the controller 14, and the storage 15 operate by the power received by the wireless power receiver 18.

The controller 14 is configured to perform the boot processing described in the first embodiment after the wireless power reception of the wireless power receiver 18 is started, in particular after the wireless power receiver 18 proceeds from the first phase to the second phase, in addition to performing the function described in the first embodiment. The operation after the boot processing is the same as that in the first embodiment.

Here, the operation of the wireless power receiver 18 will be described in more detail.

It is assumed that, at first, the radio communication apparatus on the power transmission side is transmitting power and information enabling negotiation by modulating the second wireless signal.

First, when the radio communication apparatus 100a is brought close to the radio communication apparatus on the power transmission side, the wireless power receiver 18 performs negotiation for stable wireless power reception according to the start of wireless power reception (the first phase). Specifically, the wireless power receiver 18 starts wireless reception of power enabling negotiation, by the second wireless signal transmitted by the radio communication apparatus on the power transmission side.

Then, the wireless power receiver 18 operates using the received power and demodulates, and modulates, the second wireless signal to perform negotiation with the radio communication apparatus on the power transmission side. During the negotiation, mutual authentication is performed, or the wireless power receiver 18 transmits permission for power transmission or setting of transmission power, for example.

When the negotiation is complete, the radio communication apparatus on the power transmission side starts stable wireless power transmission by the second wireless signal, according to the result of the negotiation. Specifically, the radio communication apparatus on the power transmission side continuously wirelessly transmits power greater than the power enabling negotiation.

Thereby, the wireless power receiver 18 starts stable wireless power reception after the negotiation is completed (second phase).

In this way, according to the present embodiment, the controller 14 performs the boot processing after the wireless power receiver 18 has shifted from the first phase to the second phase, that is, after stable wireless power reception is started. Therefore, it is possible to prevent a problem that the boot processing is started in an unstable wireless power reception state and thereafter the boot processing or other subsequent processing is interrupted by a shortage of the received power.

Further, it is possible to obtain the effect of the first embodiment.

Further, as in the first embodiment, the radio communication apparatus 100a performs the near field communication instead of the close proximity wireless communication.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:
1. A radio communication apparatus comprising:
a radio communicator configured to perform close proximity wireless communication or near field wireless communication with other radio communication apparatus;
a storage configured to store data, setting parameters associated with the data, and an application; and
a controller configured to execute the application and configured to control a transmission and reception of the data performed by the radio communicator on the basis of the application,
wherein the application can be set to a read-only mode by an operation of a user,
the setting parameters comprise transfer permission information,
the controller checks whether or not a user is an authorized user of the radio communication apparatus, when the user is the authorized user, the controller executes the application and thereby activates the radio communicator,
after the controller activates the radio communicator, when the application is not set to the read-only mode, the controller determines whether or not there is a transfer permission on the basis of the transfer permission information of the setting parameter, and
when the controller determines that there is the transfer permission, the controller causes the radio communicator to transfer the data,
the controller checks whether or not the user is the authorized user of the radio communication apparatus, when the user is not the authorized user, the controller does not execute the application and does not activate the radio communicator,
after the controller activates the radio communicator, when the application is set to the read-only mode, the controller causes the radio communicator not to transfer the data,
the controller determines whether or not there is the transfer permission on the basis of the transfer permission information of the setting parameter,
when the controller determines that there is no transfer permission, the controller causes the radio communicator not to transfer the data,
the storage stores an activation code unique to the authorized user and identification information unique to the radio communication apparatus,
the controller performs a predetermined calculation between the activation code and the identification information to obtain a calculation result, when the calculation result corresponds to the user information input by the user for log-in, the controller confirms that the user is the authorized user, the setting parameters comprise presence or absence of an encryption instruction, when the controller determines that there is the transfer permission, the controller determines whether or not there is the encryption instruction in the setting parameters, when there is the encryption instruction, the controller encrypts the data and causes the radio communicator to transfer the encrypted data, when there is no encryption instruction, the controller causes the radio communicator to transfer the data without encrypting the data, the storage unit stores transfer trace information associated with the data, the transfer trace information comprising information related to transfer of the data, after the transfer of the data is completed, the controller records the information related to the transfer of the data in the transfer trace information, the controller reads the transfer trace information from the storage before determining whether the transfer permission is present, after activating the radio communicator, the controller determines whether the transfer permission is present based on the transfer permission information and the read transfer trace information, the transfer permission information comprises presence or absence of an initial transfer permission and a permitted number of transfer times, the transfer trace information comprises the number of data transfer times as the information related to transfer of the data, when there is the initial transfer permission and the number of data transfer times in the transfer trace information is smaller than the permitted number of transfer times, the controller determines that there is the transfer permission, and when there is no initial transfer permission or when the number of data transfer times is greater than or equal to the permitted number of transfer times, the controller determines that there is no transfer permission.

2. The radio communication apparatus of claim 1, wherein the transfer trace information comprises information of the number of data transfer times and the number of times a transfer request is ignored.

3. The radio communication apparatus of claim 2, wherein when the controller receives the transfer request, when the application is set to the read-only mode, and when the controller determines that there is no transfer permission, the controller updates the number of times the transfer request is ignored.

4. The radio communication apparatus of claim 1, wherein the data is data of a paid content and the paid content comprises a free part, and the transfer trace information comprises the number of transfer times of the free part.

5. The radio communication apparatus of claim 1, comprising:

a wireless power receiver configured to wirelessly receive a power from the other radio communication apparatus, wherein the radio communicator, the controller, and the storage operate by the power received by the wireless power receiver.

6. The radio communication apparatus of claim 5, wherein the radio communicator performs a transmission and reception of the data by a first radio signal, the wireless power receiver receives the power by a second radio signal, and the frequency of the second radio signal is lower than the frequency of the first radio signal.

* * * * *